United States Patent
Jimenez (10) Patent No.: US 10,129,596 B2
(45) Date of Patent: Nov. 13, 2018

(54) ADAPTIVE ROW SELECTION

(71) Applicant: Netflix, Inc., Los Gatos, CA (US)

(72) Inventor: Antonio Molins Jimenez, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 245 days.

(21) Appl. No.: 13/746,031

(22) Filed: Jan. 21, 2013

(65) Prior Publication Data
US 2014/0208268 A1   Jul. 24, 2014

(51) Int. Cl.
| | | |
|---|---|---|
| *G06F 3/048* | (2013.01) | |
| *H04N 21/472* | (2011.01) | |
| *H04N 21/25* | (2011.01) | |
| *H04N 21/258* | (2011.01) | |
| *H04N 21/442* | (2011.01) | |
| *H04N 21/658* | (2011.01) | |

(52) U.S. Cl.
CPC ..... *H04N 21/47202* (2013.01); *H04N 21/252* (2013.01); *H04N 21/25891* (2013.01); *H04N 21/44222* (2013.01); *H04N 21/6582* (2013.01)

(58) Field of Classification Search
None
See application file for complete search history.

(56) References Cited

U.S. PATENT DOCUMENTS

| | | | | |
|---|---|---|---|---|
| 7,725,342 B2* | 5/2010 | Keohane | ............ | G06Q 10/1095 705/7.19 |
| 8,060,466 B1* | 11/2011 | Round | .............. | G06F 17/30893 707/609 |
| 8,725,739 B2* | 5/2014 | Liang et al. | .................. | 707/740 |
| 9,002,098 B1* | 4/2015 | Chelian | ................. | G06T 7/0044 382/153 |
| 2006/0230061 A1* | 10/2006 | Sample et al. | ............ | 707/103 R |
| 2008/0243637 A1* | 10/2008 | Chan | ....................... | G06Q 30/02 705/26.1 |
| 2009/0163183 A1* | 6/2009 | O'Donoghue | .......... | G06Q 30/02 455/414.1 |
| 2011/0040756 A1* | 2/2011 | Jones | ................ | G06F 17/30864 707/737 |
| 2011/0184951 A1* | 7/2011 | Paparizos | ......... | G06F 17/30864 707/737 |
| 2012/0317123 A1* | 12/2012 | Green | ............... | G06F 17/30867 707/748 |
| 2013/0185198 A1* | 7/2013 | Lorch | .................... | G06Q 20/29 705/39 |
| 2013/0290339 A1* | 10/2013 | LuVogt | ............. | G06F 17/30867 707/740 |
| 2013/0290905 A1* | 10/2013 | LuVogt | .................. | G06N 3/006 715/835 |

(Continued)

*Primary Examiner* — Andrey Belousov
*Assistant Examiner* — Haimei Jiang
(74) *Attorney, Agent, or Firm* — Artegis Law Group, LLP (57) ABSTRACT

Embodiments provide techniques for presenting a user interface. An initial interface containing a first plurality of selectable elements is presented to a user. Embodiments assign the user to a first one of a plurality of preference groups. A plurality of selections made by the user of selectable elements from the plurality of selectable elements are detected. Embodiments then generate a second interface for the user that includes a second plurality of selectable elements, based on the first preference group to which the user is assigned and the selectable elements selected by the user.

18 Claims, 6 Drawing Sheets

(56) References Cited

U.S. PATENT DOCUMENTS

| | | | |
|---|---|---|---|
| 2013/0325769 A1* | 12/2013 | Downs | G06F 17/2745 706/18 |
| 2014/0074649 A1* | 3/2014 | Patel | G06Q 30/0631 705/26.7 |
| 2014/0075385 A1* | 3/2014 | Wan | G06Q 10/1093 715/812 |
| 2014/0208268 A1* | 7/2014 | Jimenez | H04N 21/47202 715/811 |
| 2014/0245353 A1* | 8/2014 | Raza | H04N 21/4821 725/44 |

* cited by examiner

ADAPTIVE ROW SELECTION

BACKGROUND OF THE INVENTION

Field of Invention

Embodiments of the present invention relate generally to digital media and, more specifically, to sorting digital media based on user preferences.

Description of Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file.

Many content servers contain more digital content files than can reasonably be presented to a user at a single point in time. For instance, a particular content server may contain 10,000 different digital content files, each corresponding to a separate identifying title. However, in such an example, even if all 10,000 digital content files could be presented to the user at once, such a presentation may well overwhelm the user with information and content the user may be interested in watching could become hidden by the amount of other content being displayed. As such, many content servers attempt to identify a limited number of digital content files that will be relevant to a particular user and present only this limited set of content files to the user.

SUMMARY OF THE INVENTION

One embodiment of the invention disclosed herein provides a method of presenting a user interface. The method includes presenting an initial interface containing a first plurality of selectable elements to a user, where the first plurality of selectable elements is divided into a first plurality of groups. Additionally, the method includes assigning the user to a first one of a plurality of preference groups. The method also includes detecting a plurality of selections of selectable elements made by the user. The method further includes generating a second interface for the user that includes a second plurality of selectable elements organized into a second plurality of groups, based on the first preference group to which the user is assigned and the groups to which the selectable elements selected by the user belong.

Other embodiments include, without limitation, a non-transitory computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In order to assist users in navigating a collection of digital content items, many content servers will present a number of these digital content items and allow the users to select one of the content items for playback. As many content servers host more instances of digital content than can reasonably be presented to a user at one time, the content servers may select a subset of digital content to present to the user. For instance, while a particular content server may host 50,000 different content items, it may select only 50 of these content items to display to a user at one time. When presenting these content items to the users, it is generally desirable for the content servers to present content items that are relevant to the users viewing them and that the users will find interesting. That is, a user browsing the content server may be searching for a content item to select for immediate playback (e.g., via streaming media), but the user may only be truly interested in watching a subset of all the content items on the content server. Thus, for example, a content server could choose to present users with a listing of the most popular content items across all the users of the content server. While such a technique may provide relevant content for a broad selection of users, it does not account for the specific preferences of each particular user.

Additionally, content servers may group their various content items into various genres, and could use these genres for identifying content to present to a user. For example, such categories could include Action & Adventure, Westerns, Comedies, Family Movies, etc. When creating a graphical user interface for a particular user, the content server could determine which genres the user is likely to be interested in and could select content items from these genres to include in the interface. Additionally, since a given genres may include more content items than can be reasonably placed in the interface at one time, the content server may select a portion of the content items from each of the selected genres to display to the user.

In addition to dividing content items into various genres, some content servers may use various algorithms to select content items meeting various conditions. For example, one such algorithm could select content items that are Westerns and also content items that are likely to be enjoyed by users who like Western-themed movies. The content items selected by such an algorithm could then be displayed in the user interface under the category "Westerns". In such an embodiment, the algorithm is designed to select content items that will be enjoyed by users who enjoy Westerns, even though the algorithm may select some content items that are not classified as Westerns.

Generally speaking, content servers may divide their hosted content items into any number of different categories. Additionally, various content servers could use any number of different algorithms for selecting particular content items. However, when generating a user interface for a particular user, it may not be practical to include selections from all of the different categories on the interface. That is, assuming a particular content server has one hundred different categories of content items, it may be impractical to show selections from all of these content items on the screen at one point in time, as to do so would overload the user with information and would produce a cluttered interface that is difficult to use. As such, the content server may select a subset of categories (or algorithms) to display on the interface at one time.

As such, embodiments provide techniques for generating a user interface. As an initial note, while embodiments are described herein with respect to sorting categories of content on a streaming content server, it is broadly contemplated that the techniques described herein can be applied in any number of different contexts. As such, the following examples of embodiments configured to sort content within a user interface for a content server are without limitation and for illustrative purposes, and more generally embodiments may be employed for sorting content in a wide variety of different contexts. Moreover, the terms algorithms (or content selection algorithms) and categories (or content categories), although distinct, are interchangeable throughout the present disclosure. In other words, it is broadly contemplated that techniques described herein for organizing an interface containing content selected from a variety of different content-selection algorithms can also be applied to an interface containing content selected from a variety of different categories, and vice versa.

Returning to the example of an embodiment configured to generate a user interface for a content server, embodiments may present an initial interface containing a first plurality of selectable elements to a user. For example, on a content server hosting a plurality of different content items (e.g., streaming video titles), the content server could generate an initial interface for the user containing different categories of content. The categories included in the initial interface could be selected based on, for instance, which categories of content are most popular amongst all the users of the content server.

In one embodiment, the categories in the initial interface are selected based on metadata for the user. For instance, logic for the content server could determine that the user is a 13 year old male and, based on this, could select categories for inclusion in the initial interface that are likely to be of interest to a 13 year old male viewer. In some cases, the content server may have data characterizing previous selections made by the user within various content categories on the content server. In such cases, the content server could generate an initial interface for the user that includes content items likely to be of interest to the user, based on the user's previous selections on the content server.

Additionally, logic on the content server could assign the user to one of a plurality of preference groups. For example, embodiments could apply a clustering algorithm to all of the users of the content server that divides the plurality of users into a plurality of groups. Generally, the clustering algorithm is adapted to place users with similar interests into the same preference group. For instance, the clustering algorithm could partition the users into groups based on each user's previous selections of content items. As another example, the clustering algorithm could partition the users based on metadata associated with each of the users. As yet another example, the clustering algorithm could partition the users into groups based on each user's previous selection of content categories (e.g., separating users that frequently watch "Top 10" from users who frequently watch "New Releases"). More generally, it is broadly contemplated that the clustering algorithm could divide the users into groups based on these factors, as well as any number of other factors could be considered, either alone or in combination.

Thus, for example, the clustering algorithm could create one group for users that enjoy "Top 10" movies (e.g., the 10 most popular movies on the content server), enjoy action/adventure movies and dislike documentaries, and could create a second group of users that enjoy "Top 10" movies, dislike action/adventure movies and enjoy romantic comedies. Thus, the groups may be based not only on a user's like (or dislike) for one particular category, but rather could represent the user's tastes with respect to the various categories as a whole and correlations between the various categories.

Generally, the clustering algorithm is applied to sort the users into some number of groups. In one embodiment, the number of groups is a predefined value (e.g., set by a developer or system administrator of the content server). In a particular embodiment, logic on the content server is configured to dynamically determine an optimal number of groups. For example, the clustering algorithm could consider the preferences of the users as a whole and could create as many groups as would satisfy some set of criteria. For instance, the clustering algorithm could require that each group created have some minimum amount of users assigned to that group, and could be configured with a maximum total number of groups that may be created. The clustering algorithm could then create the groups, and each group could have a respective interest value for each of the various content categories as well as correlation data between various categories and other content categories. Embodiments could then partition the users into the created groups.

Embodiments may take other factors into account as well in calculating the interest values for each of the groups. For example, the clustering algorithm could consider one or more confounding factors. Examples of such compounding factors could include, for instance, the popularity of movies in the category, a distance (e.g., in terms of similarity) to the group's users' rental history, positional bias (e.g., how predominant a position within the interface content items were positioned, when they were previously selected), and so on. For instance, upon determining that a particular content item is very popular on the content server, embodiments could discount the contribution of selections of this content item towards the interest values, as these selections may be based in large part on the content item's popularity rather than the user's actual interest in the category associated with the content item. Advantageously, by discounting the contribution of particular historical selections to each group's interest values, based on the confounding factors, embodiments can more accurately estimate the interests of a group's members by not allowing extraneous factors (e.g., the popularity of a particular content item) to unduly elevate a particular one of the interest values.

Embodiments may also monitor a user's interactions with the initial interface and could detect selections made by the user. That is, logic on the content server could determine when the user selects a content item for playback and could record the category to which the selected content item belongs. This selection data may then be used for generating subsequent user interfaces for the user. Thus, for example, assume that the initial interface for a particular user includes content from a "Top 10" category in a more-prominent area of the screen and includes content from the "Action/Adventure" category in a less-prominent area of the screen. If the content server then determines that the particular user is frequently selecting content items from the "Action/Adventure" category, but has never selected a content item from the "Top 10" category, the content server could re-order the content shown in subsequent user interfaces for the user to show the content from the "Action/Adventure" category in the more-prominent area of the screen.

In generating the subsequent user interface for the user, the content server may also consider the preference group to which the user is assigned. For instance, the content server could use the user's assigned preference group to determine how much to weight a given selection of a content item. For example, assume that the content server detects that the user has selected the movie "Iron Man®" for playback, and that this movie belongs to the "Action/Adventure" category. The content server could further determine, based on the preference group to which the user is assigned, an estimated probability that the user is interested in this movie. For example, if the user's assigned preference group indicates that the user enjoys "Action/Adventure" movies, the content server could determine that it's likely the user is interested in the movie "Iron Man®."

Additionally, such an estimated probability could further be based on the user's personal browsing history on the content server as well. Thus, for example, if the user's personal browsing history indicates that the user frequently watches superhero movies, the content server could determine that this merits an increased estimated interest value for the user for the movie "Iron Man®." As yet another example, the content server could determine the estimated interest value based on metadata for the user. As an example, if the metadata indicates that the user is a 20 year old male, the content server could determine that users in this demographic typically are interested in the movie "Iron Man®" (and/or in "Action/Adventure" movies more generally), and could increase the estimated probability of interest accordingly. More generally, the content server could consider any factor that is indicative of a user's interest in a content item or some classification or categorization of content.

In one embodiment, logic on the content server could adjust the interest value calculated for a particular user for a given content item, by the calculated interest value for the particular user for the content item's category (or content selection algorithm). For example, the logic could calculate an adjusted interest value for the particular user and the given content item by taking the product of the user's estimated interest value for the given content item and the user's estimated interest value for the content item's category. By weighting down the significance of a given selection event (e.g., the user selecting the given content item on the content server for streaming playback) where the user's estimated interest value for the given content item is high, embodiments can isolate playback events that are maximally informative of the user's preferences for the various content categories (or content selection algorithms). Advantageously, doing so allows embodiments to separate a user's interest in a particular content category (or content selection algorithm) from the user's interest in the content item itself, and thus can more finely approximate a particular user's preferences.

Such advantages are particularly pronounced in content servers where a single content item can be presented to the user using a number of different categories and/or content selection algorithms. That is, since a user's interest in the single content item can vary depending on how the content item is presented to the user, it is particularly advantageous for embodiments to separate the user's interest in the content item from the user's interest in the item's category (or content selection algorithm). For example, assume that a user likes to follow the movies directed by a particular director, and the content server includes a movie directed by this director classified into the "Westerns" category. Although the user may be unlikely to play the content item if the content item was presented as part of a "Westerns" category, and the logic on the content server may maintain a low interest value for the user with regard to the "Westerns" category (i.e., indicating that the user is not very interested in this category), the user may be very interested in the content item if the content item is presented as part of a "More movies directed by the particular director" content selection algorithm. In such an example, if the logic on the content server detects that the user has selected this content item when the content item was presented using the content selection algorithm, the logic could adjust the user's interest value in the content selection algorithm accordingly. For instance, the logic could increase the user's interest value in the content selection algorithm (i.e., indicating that the user is more interested in the content selection algorithm) based on this selection, and could increase the interest value by a substantial amount because of the user's low interest value in the "Westerns" category. Advantageously, such an inverse weighting system enables embodiments to separate the user's interest in the content item's category from the user's interest in the content item itself (as well as other groups and content selection algorithms).

Additionally, logic on the content server could calculate an estimated interest value approximating the user's interest in a selected content item, and could use this estimated interest value to determine how influential the selection of the content item should be on the interest values for categories (and/or content selection algorithms) maintained on the content server for the user. As discussed above, these interest values can be used to generate subsequent user interfaces presented to the user. In one embodiment, the weight of a given selection could be indirectly proportional to the estimated interest value for the selected content item. Thus, in such an embodiment, the content server could consider a selection of a content item that the user is likely interested in (i.e., as represented by a greater estimated interest value) to be less influential than a selection of another content item that the content server predicted the user would not be interested in (i.e., as represented by a lower estimated interest value). That is, in the situation where the content server predicted the user would be interested in a particular content item (or a particular category or classification of content associated with the content item) and user then selects the content item from the interface, the content server could determine that its estimation of the user's interests was correct and that the user's selection should have little impact on the content server's interest data for the user (e.g., the estimated interest value for the user relating to the category the content item belongs to). As such, the content server could update its maintained preferences data for the user, increasing the value(s) characterizing the user's interest in the select item's category (e.g., "Action/Adventure" movies) by a relatively small amount.

On the other hand, if the content server predicted that the user would not be interested in the selected content item (i.e., based on a lower estimated interest value for the user with respect to the selected content item), the user's selection of that content item may indicate that the content server's estimation of the user's interests is incorrect. As such, in this scenario, the content server could consider the user's selection to be more influential towards the preference data maintained for the user on the content server. For example, if the content server predicted that a particular user would not be interested in the movie "Iron Man®" (e.g., a user assigned to a preferences group indicating a dislike of "Action/Adventure" movies), and then the user selects the movie "Iron Man®" for playback, the content server could update its maintained preferences data for the user, increasing the value(s) characterizing the user's interest in "Action/Adventure" movies by a larger amount (relative to had the content server predicted that the particular user would be interested in the movie "Iron Man®").

Subsequently, when rendering a user interface for the user, the content server can consider the updated user preferences data when selecting content items and categories of content items to include in the interface. Thus, continuing the examples above where the data characterizing the user's interest in "Action/Adventure" movies was increased to indicate a more likely interest in this category of movies, the subsequently generated user interfaces could be more likely to include movies from the "Action/Adventure" category. For instance, the content server could be configured to determine a user's estimated interest in each category of content (or algorithm for selecting content items) used by the content server, and to select a predetermined number of categories that the user is most likely to be interested in for inclusion in the interface. Advantageously, doing so provides an intelligent way of generating a user interface that includes content the user is likely to be interested in. Additionally, while the following examples herein pertain to the presentation of content items and categories of content in a user interface for a streaming content server, such examples for provided for illustrative purposes only and without limitation. Moreover, it is broadly contemplated that the techniques described herein could be applied to any number of different applications.

Figure 1:
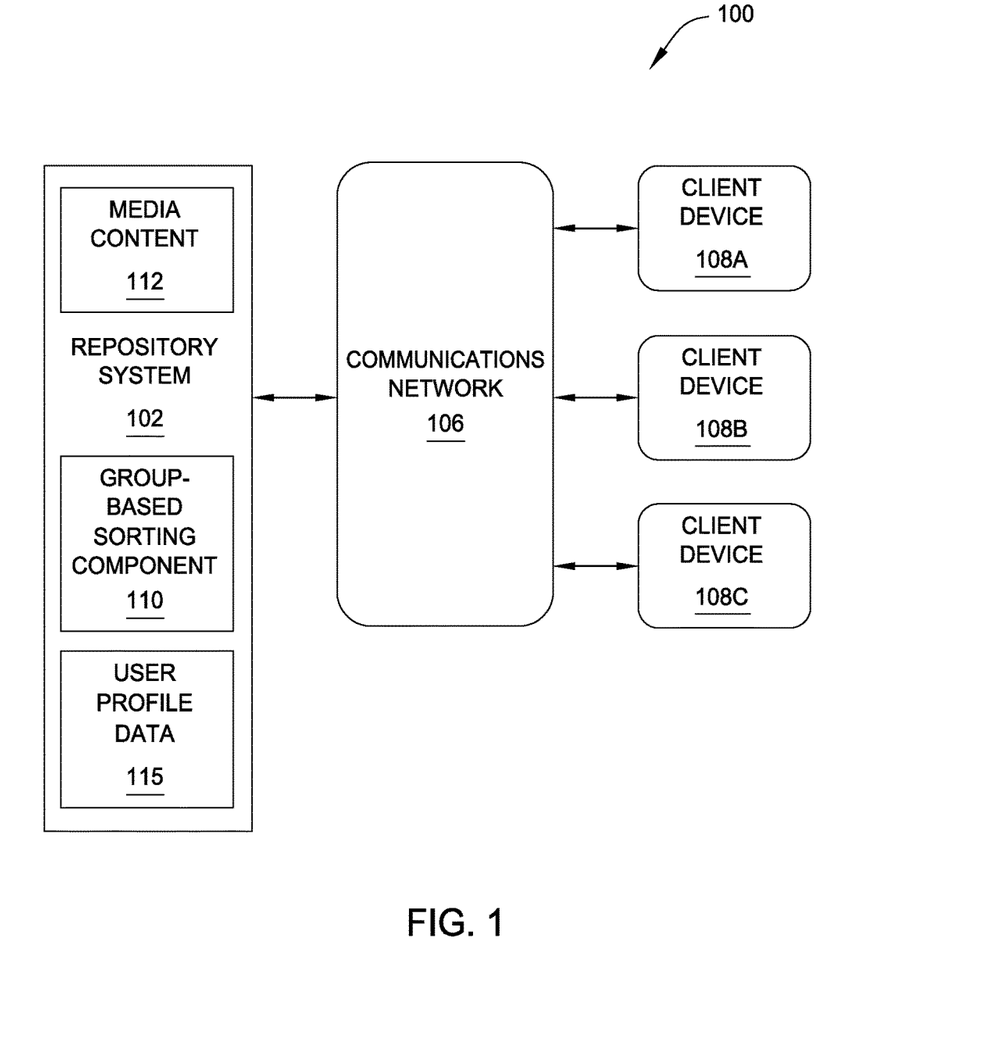
FIG. 1 illustrates a computing infrastructure configured to implement a group-based sorting component, according to one embodiment described herein.

FIG. 1 illustrates a computing infrastructure configured to implement a group-based sorting component, according to one embodiment described herein. As shown, the computing infrastructure includes a repository system 102 and a plurality of client devices 108A, 108B, and 108C, each connected to a communications network 106. Illustratively, each of the client devices 108A, 108B, and 108C communicates with the repository system 102 over the network 106 to download variations of a software system. Of course, other approaches may be used to allow the client devices 108A, 108B, and 108C to receive a software system dynamically from the repository system 102.

In this example, client devices 108A, 108B, and 108C are configured as consumer devices, such as a consumer electronic device. For instance, the client device 108A could represent a player component capable of executing an Adobe Flash® file, Microsoft® Silverlight® package, a BrightScript application, or an HTML5 object. For example, and without limitation, the client device 108A could be a personal computer system, the client device 108B could be a tablet computing device, and the client device 108C could be an electronic gaming console (e.g., a Microsoft Xbox 360®, a Sony PlayStation® 3, etc.). More generally, however, the client devices 108A-C represent any device capable of receiving streaming content and outputting such content for playback.

The repository system 102 includes media content 112, a group-based sorting component 110 and user profile data 115. Generally, the media content 112 represents any digital media content that can be streamed to a client device 108A-C. Examples of such media content 112 include, without limitation, video content, audio content, image content and computer gaming content. As described in greater detail below, the group-based sorting component 110 is generally configured to partition the users of the repository system 102 into a plurality of interest groups (e.g., through the application of a clustering algorithm) and to use the group to which a user is assigned to determine an amount of weight to assign to the user's selections of media content 112.

As discussed above, the group-based sorting component 110 could maintain content preferences data for each of the groups. That is, the group-based sorting component 110 could maintain data, for each of the groups, for each category of content items (or algorithm for selecting content items) used by the repository system 102, indicative of how likely members of the group are to be interested in content items within the category (or selected by the algorithm). As an example, the group-based sorting component 110 could maintain data indicating that one group includes users that are most interested in "Action/Adventure" movies (e.g., a category of movies) and "Top 10" movies (e.g., an algorithm for selecting the 10 most popular content items on the content server), while another group includes users that are most interested in "Documentaries" and "Western" movies.

In one embodiment, the group-based sorting component 110 is configured to use the assigned group for a particular user to estimate the user's likely interest in a selected content item. For example, when the user selects a particular content item for playback, the group-based sorting component 110 could calculate an estimated interest value that approximates the user's predicted interest in the selected content item. Such an estimated interest value could be calculated based on, for example, the interest group to which the user has been assigned, previous content selections made by the user, metadata about the user, and so on. The group-based sorting component 110 could then use the estimated interest value to determine a weighted impact of the user's selection of the content item, on the content interests data maintained in the user profile 115 for the user.

For example, assume that the selected content item belongs to the "Romantic Comedies" category. Here, if the group-based sorting component 110 determines, based on the existing user profile data 115 for the user, that the user is unlikely to be interested in movies from this category, the group-based sorting component 110 could determine that the selection should have a greater impact on the data characterizing the user's interests in movies from this category. That is, since the user has selected a content item belonging to a category the group-based sorting component 110 previously thought the user was uninterested in, the group-based sorting component 110 could determine that its existing user profile data 115 for the user may be inaccurate with respect to "Romantic Comedies." Accordingly, the group-based sorting component 110 could increase the interest data for the user with respect to "Romantic Comedies" by a relatively large amount. On the other hand, if the group-based sorting component 110 had determined, based on the existing user profile data 115 for the user, that the user is very likely to be interested in the selected content item, the group-based sorting component 110 could update the interest data for the user with respect to "Romantic Comedies" by a relatively small amount. That is, the group-based sorting component 110 could determine that it correctly estimated the user's interest in the selected content item (i.e., because the group-based sorting component 110 determines the user was very likely to be interested in the content item and the user then selected the content item), and thus could determine that the existing user profile data 115 for the user with respect to "Romantic Comedies" is accurate.

Figure 2:
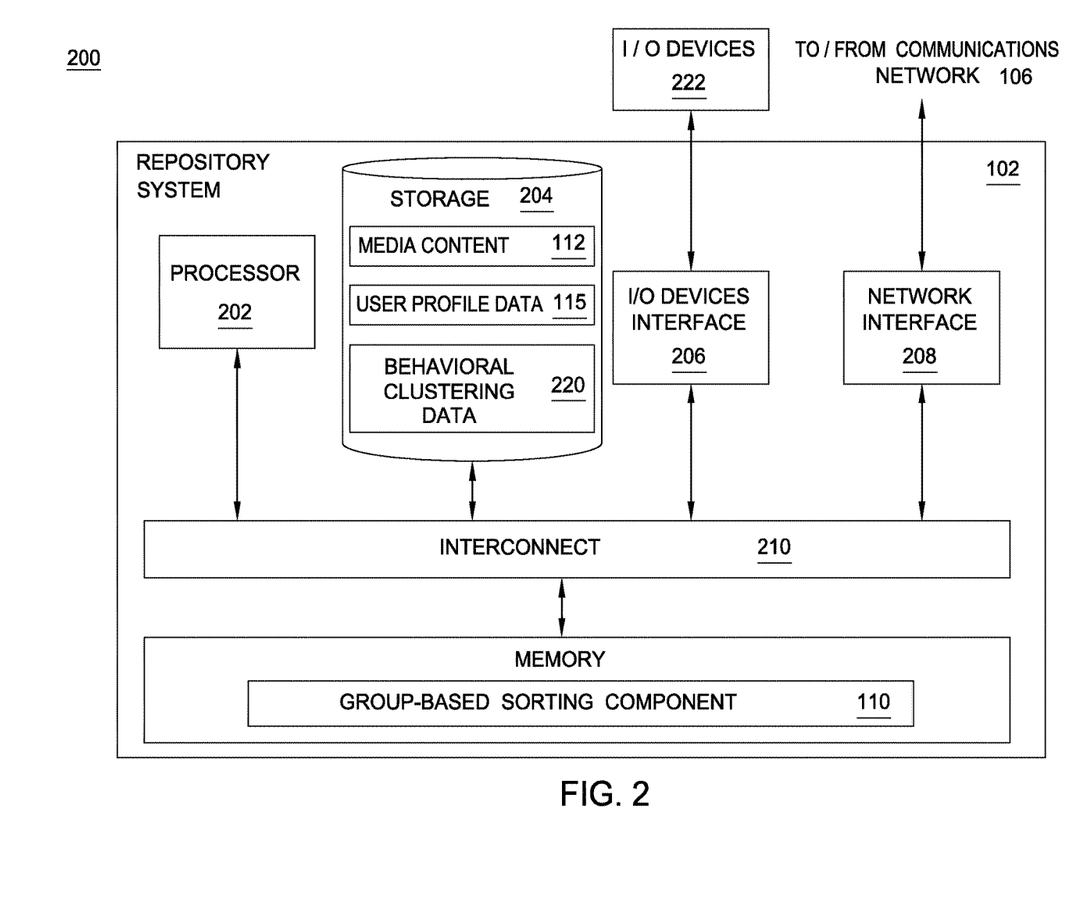
FIG. 2 illustrates a computing infrastructure configured to implement a group-based sorting component, according to one embodiment described herein.

FIG. 2 illustrates a computing infrastructure configured to implement a group-based sorting component, according to one embodiment described herein. As shown, the repository system 102 includes, without limitation, a central processing unit (CPU) 202, a network interface 215, an interconnect 210, and a system memory 212. The CPU 202 retrieves and executes programming instructions stored in the system memory 212. Similarly, the CPU 202 stores and retrieves application data residing in the system memory 212. The interconnect 210 facilitates transmission, such as of programming instructions and application data, between the CPU 202, input/output (I/O) devices interface 222, storage 204, network interface 208, and system memory 212. The I/O devices interface 222 is configured to receive input data from user I/O devices. Examples of user I/O devices may include one of more buttons, a keyboard, and a mouse or other pointing device. The I/O device interface 222 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). The network interface 208 is configured to transmit data via the communications network 106, e.g., to transmit context tokens and localized digital assets 226 from the client devices 108A, 108B, and 108C, as well as to return a assembled variation of digital content generated by the dynamic context-based assembler 220 to the client devices 108A, 108B, and 108C.

The system memory 212 stores a weight learning sorting component 110 that is configured to sort a plurality of content items based on relevancy of the content items to a particular user. Generally, the group-based sorting component 110 is configured to present a user interface to a user, where the interface includes groups of content calculated to be of interest to the user. For example, the group-based sorting component 110 could present an initial interface to the user. The initial interface could include a first plurality of selectable elements is presented to a user. For instance, for an embodiment where the group-based sorting component 110 is configured for a content server, the group-based sorting component 110 could generate an initial interface that includes the most popular categories of content on the content server.

Additionally, the group-based sorting component 110 could assign the user to a first one of a plurality of preference groups. As discussed above, the group-based sorting component 110 could apply a clustering algorithm to all of the users of the content server, in order to partition the users into a variety of groups based on each user's estimated interest in the various categories of content (or content-selection algorithms) on the content server. Generally, each group represents a certain set of content interests for the various categories of content (or content-selection algorithms) on the content server, and the clustering algorithm could assign each user to a respective group based on the user's content interests matching the content interests defined for the group. The number of different groups could be a preconfigured number (e.g., set by a developer of the group-based sorting component 110). In one embodiment, the group-based sorting component 110 is configured to dynamically determine the number of groups to use. For example, the group-based sorting component 110 could be configured to generate a new group whenever particular conditions are met (e.g., a minimum number of users would be assigned to the group, the group is sufficiently distinct from other existing groups, etc.). Thus, in such an embodiment, the number of groups (as well as the content interests assigned to each group) may vary across different sets of users.

The group-based sorting component 110 could then determine when the user makes a selection from the initial interface. Upon detecting the selection, the group-based sorting component 110 could generate a weighted impact value for the selection. The weighted impact value generally reflects how much influence the selection will have on the interests data the group-based sorting component 110 maintains for the user. The group-based sorting component 110 could then generate an updated interface for the user that includes a second plurality of selectable elements, based on the first preference group to which the user is assigned and the updated interests data for the user.

In some embodiments, the group-based sorting component 110 is configured to reevaluate a user's interest group assignment. For example, upon updating the interests data for the user, the group-based sorting component 110 could determine whether the user's current interests group assignment is still accurate, in view of the updated interests data. For instance, assume that the group-based sorting component 110 initially determines that a particular user is not interested in "Action/Adventure" movies. Accordingly, the group-based sorting component 110 could generate a user interface for the user that only includes a small number of "Action/Adventure" titles positioned in a less-prominent area of the interface. However, if the group-based sorting component 110 then detects that the user has selected a number of different titles from the "Action/Adventure" category for playback, the group-based sorting component 110 could update the interests data for the user to greatly increase the user's interests in the "Action/Adventure" category. That is, because the group-based sorting component 110 has determined that the user is unlikely to be interested in movies from the "Action/Adventure" category, and yet the user has made numerous selections of content items from the "Action/Adventure" category, the group-based sorting component 110 could determine that its interests data for the user with respect to this category was incorrect, and could make a substantial adjustment to this interests data.

Once the interests data is adjusted, the group-based sorting component 110 could determine whether the user's group assignment is still appropriate. For instance, if the user's interests data now indicates that the user has a strong interest in "Action/Adventure" titles, but the user is assigned to a group of users who have very little interests in "Action/Adventure" movies, the group-based sorting component 110 could determine a different interests group that better matches the user's updated interests data, and could assign the user to that group.

As discussed above, the interests groups can be used to estimate how interested users are in various categories of content. For example, after assigning a particular user to a particular interest group, the group-based sorting component 110 could retrieve preference data associated with the particular interest group. The preference data could specify, for instance, a predicted interest value for each category (and sub-category) of content on the content server. Additionally, the preference data can include correlational data that is indicative of relationships between the various content categories on the content server with respect to a particular set of users. For example, such correlational data could indicate that users in a particularly group that are interested in "Action/Adventure" content items are also likely to be interested in content items in the "Westerns" category. As discussed above, categories on a content server could include various genres of content (e.g., Action/Adventure, Romantic Comedies, etc.), or, as another example, could include algorithms configured to return a set of content items based on conditional logic (e.g., a "Top 10" algorithm that returns the 10 most popular content items on the content server).

Once the preference data is retrieved, the group-based sorting component 110 could retrieve historical browsing data for the particular user. The historical browsing data could include, for example, previous content items the user has watched on the content server or previous ratings the user has given for content items on the content server. More generally, it is contemplated that the historical browsing data can include any data related to the user's interactions with the content server.

The group-based sorting component 110 could then use the preference data from the assigned interest group, together with the historical browsing data for the user, to select and order the categories of content items presented to the user in the interface for the content server. As an example, assume that the user's historical browsing data indicates that the user has watched a total of 10 content items on the content server, and that of these 10 content items, 8 were in the "Action/Adventure" category and the remaining 2 were in the "Comedy" category. The group-based sorting component 110 could further determine, based on the preference group to which the user has been assigned, that users in this preference group that are interested in "Action/Adventure" content items are also likely to be interested in content items from the "Westerns" category. Accordingly, the group-based sorting component 110 could determine that, based on the preference data for the preference group to which the user is assigned, and because 8 out of the 10 content items the user has viewed belong to the "Action/Adventure" category, that the user is likely to be interested in content items from the "Westerns" category. For instance, the group-based sorting component 110 could calculate a predicted interest value for the "Westerns" category, indicating the user's interest in content items from this category.

The group-based sorting component 110 could conduct a similar analysis for the other categories of content on the content server, and a respective predicted interest value could be calculated for each of the other categories. The group-based sorting component 110 could then render an interface for the user that includes some number of content categories, and could order these categories based on the predicted interest values calculated for each of the categories. For example, the group-based sorting component 110 could position the category with the highest predicted interest value (i.e., a predicted interest value indicating that the user is more likely to be interested in content from this category) in the most predominant position within the interface, and could position the category with the lowest predicted interest value (i.e., the predicted interest value indicating that the user is less likely to be interested in content from this category) in the least predominant position within the interface. The categories in between could be ordered in a similar fashion, based on their respective predicted interest values. Advantageously, doing so provides a more useful user interface for the user, in which the content items the user is most likely to be interested in are predominantly displayed to the user.

In one embodiment, the group-based sorting component 110 could take into account the results of a particular content selection algorithm or category, when selecting the categories and/or content selection algorithms to be presented to the user in the interface. That is, for a "Westerns" category, the content server could be configured with an algorithm that selections a predetermined number of content items belonging to this category for display to the user. If the group-based sorting component 110 determines that the selected content items are poor selections for the user (e.g., due to a low estimated interest value for the user with respect to the selected content items, due to low ratings from other users for the selected content items, due to the user having previously viewed some or all of the selected content items, due a low number of selected content items, etc.), the group-based sorting component 110 could adjust the position of the "Westerns" category on the interface (or remove it from the interface altogether). Thus, even though the user's estimated interest value in the "Westerns" category may be particularly high, the group-based sorting component 110 could determine that the category should not be included in the interface due to the selections for the category being poor choices for the user.

Figure 3:
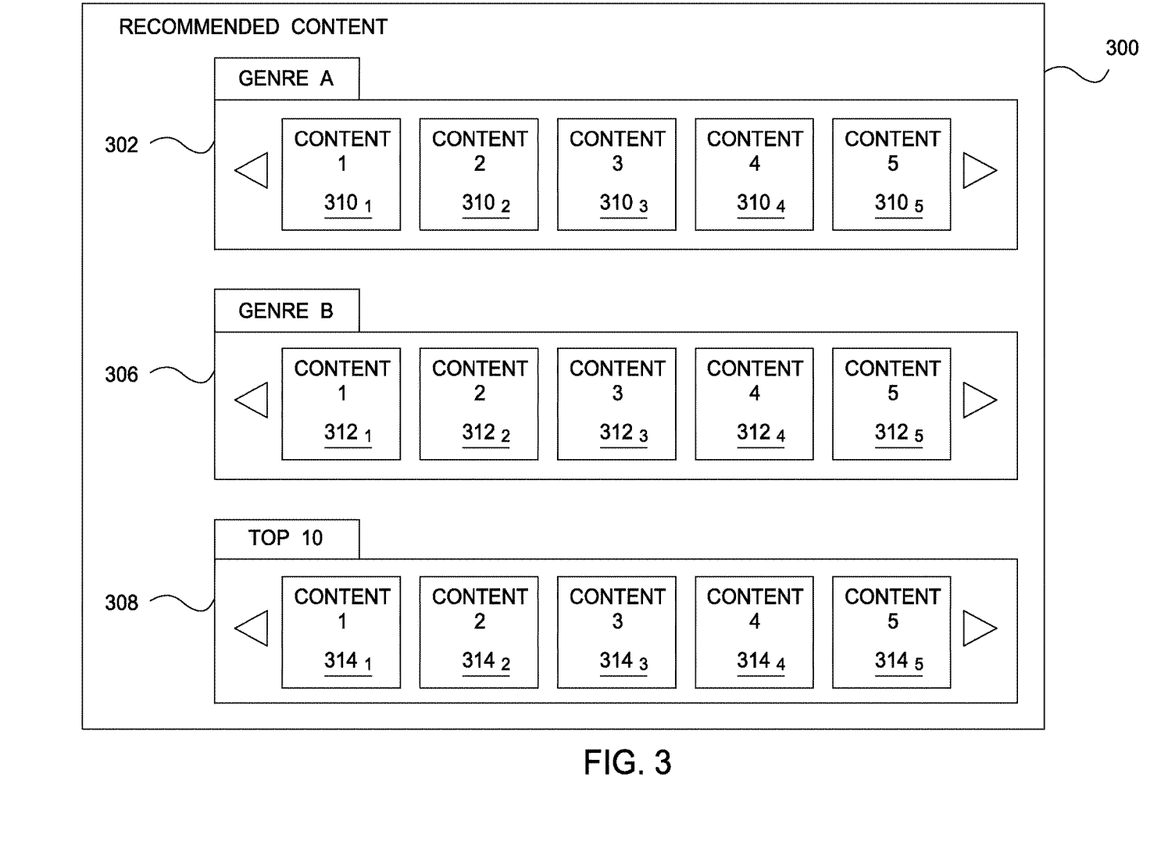
FIG. 3 is a screenshot illustrating a user interface for presenting content items, according to one embodiment described herein.

An example of such an interface is shown in FIG. 3, which is a screenshot illustrating a user interface for presenting content items, according to one embodiment described herein. As shown, the screenshot 300 includes a first content category 302, a second content category 306 and a third content category 308. Here, the categories 302 and 306 relate to genres of content on the content server (i.e., "Genre A" and "Genre B"), while the category 308 relates to a content selection algorithm on the content server (i.e., "Top 10"). Here, the content category 302 includes a selection of content items $310_{1-5}$ from the "Genre A" category, the content category 306 includes a selection of content items $312_{1-5}$ from the "Genre B" category, and the content category 308 includes a selection of content items $314_{1-5}$ from the "Top 10" category.

In this example, assume that the group-based sorting component 110 has calculated predicted interest values for each of the categories of content available on the content server and with respect to a particular user, based on a preference group to which the particular user is assigned and further based on the user's personal browsing history. Additionally, assume that, in this example, the group-based sorting component 110 is configured to sort the categories within the interface in a top-to-bottom descending order, based on the respective predicted interest values for the categories.

Thus, in this example, the group-based sorting component 110 has determined that the user is most likely to be interested in content from the category 302, followed by content from the category 306, and then followed by content from the category 308. Of course, while the screenshot 300 illustrates an interface in which categories are sorted in a top-to-bottom descending order based on their respective predicted interest values, it is broadly contemplated that a variety of different interfaces could be used in accordance with the techniques described herein. For instance, another interface could be ordered in a left-to-right, top-to-bottom approach, where the category with the highest predicted interest value for the user is positioned in the most predominant portion of the interface (e.g., the top-left corner) and the category with the lowest predicted interest value is positioned in the least predominant portion of the interface (e.g., the bottom-right corner).

As discussed above, the group-based sorting component 110 may adapt the interface over time, based on the user's browsing history. That is, the ordering of the categories within the interface (or even the categories included on the interface) may change to reflect the changes in the browsing history data. For example, assume that the user for which the interface shown in the screenshot 300 was generated begins watching a substantial number of "Top 10" content items. In such an example, the group-based sorting component 110 could generate subsequent interfaces for the user in which the "Top 10" category 308 is positioned in a more predominant area of the screen. Additionally, assume that the correlational data for the group to which the user is assigned indicates that users in this group who enjoy content from the "Top 10" category, are also likely to be interested in content from "Genre C", the group-based sorting component 110 could generate the subsequent interfaces to also include the "Genre C" category. Advantageously, doing so provides an interface capable of adapting to the ever-changing preferences and interests of users, thereby providing a more useful user interface to the users.

In one embodiment, the group-based sorting component 110 is configured to weight individual selections of content items by an amount inversely proportionate to the user's predicted interest in the selected content item. For instance, the selections can be weighted inversely proportional to a calculated probability of play metric for the selected content item and with respect to the particular user. For example, assume that the interface shown in the screenshot 300 is displayed to the user, and that the user selects the content item $310_1$. Here, the group-based sorting component 110 could determine that the user's predicted interest value for the content item $310_1$ indicates that the user is very likely to be interested in this content item, and thus could determine that this selection by the user is less influential for purposes of updating the user's preferences. That is, because the user has selected a content item that the group-based sorting component 110 predicted the user would be interested in, the group-based sorting component 110 could conclude that its prediction was correct and that its preferences data and group assignment for the user are likely to be correct as a result.

On the other hand, if the user selects the content item $314_5$, the group-based sorting component 110 could determine that the user's predicted interest value for the content item $314_5$ indicates that the user is unlikely to be interested in this content item. Thus, the group-based sorting component 110 could determine that this selection by the user should be more influential for purposes of updating the user's preferences and/or group assignment. That is, because in this example the user has selected a content item that the group-based sorting component 110 predicted the user would be less interested in, the group-based sorting component 110 could determine that its estimation of the user's interests may be incorrect and thus could make more of an adjustment to the user's preference data and/or group assignment based on this selection. Advantageously, doing so enables embodiments to adapt more quickly to changes in the user's interests, by assigning a greater weight to content selections in which the prediction model was incorrect.

Figure 4:
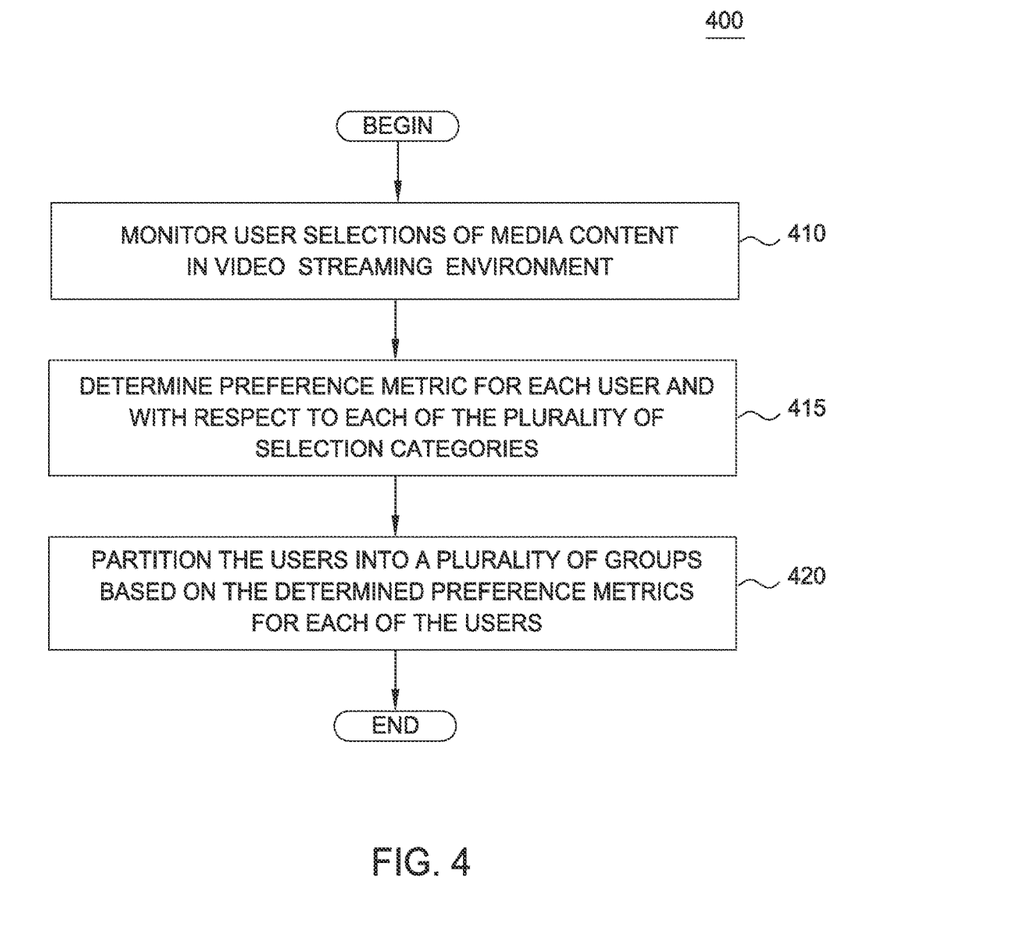
FIG. 4 is a flow diagram illustrating a method for partitioning users into interest groups, according to one embodiment described herein.

FIG. 4 is a flow diagram illustrating a method for partitioning users into interest groups, according to one embodiment described herein. As shown, the method 400 begins at block 410, where the group-based sorting component 110 monitors user selections of media content in a content streaming environment. As discussed above, the group-based sorting component 110 may collect browsing history data for each user of a content server, for use in generating individually tailored interfaces for the users. The group-based sorting component 110 then determines a preference metric for each user, with respect to each of a plurality of categories (block 415). For example, the group-based sorting component 110 could calculate the preference metric based on the user's personal browsing history, including which content items the user has watched previously, which content items the user has rated previously, and how the user rated various content items across various categories.

Additionally, the group-based sorting component 110 could consider other data and metadata associated with the user. For instance, the group-based sorting component 110 could estimate the user's preferences based on one or more demographics to which the user belongs. As an example, the group-based sorting component 110 could consider metadata about where the user lives, the user's age, the user's gender, etc., in determining the preference metric for the user. In one embodiment, the group-based sorting component 110 is configured to prompt new users with a survey regarding the user's preferences and categories that the user is interested in. Such an embodiment may be advantageous in situations where the user has not yet built up a significant browsing history on the content server.

The group-based sorting component 110 then applies a clustering algorithm to partition the users into a plurality of different groups, based on the determined preference metrics for each of the users (block 420). Generally, the group-based sorting component 110 is configured to sort the users into groups, such that users with similar interests are placed within the same group. In one embodiment, the group-based sorting component 110 is configured to sort the users into a predefined number of different groups. In a particular embodiment, the group-based sorting component 110 is configured to dynamically determine the number of groups. In such an embodiment, the group-based sorting component 110 could be configured with a predefined minimum and maximum number of groups, and could dynamically determine an ideal number of groups between these two values. Once the users are partitioned into the plurality of groups, the method 400 ends. Advantageously, by assigning similar users to a preference group, embodiments can more accurately estimate a user's interest in various categories of content on the content server. That is, by assigning the user to a preference group, embodiments can effectively use the browsing history of all the users of the preference group to more accurately estimate the user's interest in various categories of content, particularly when the user has very few selections in his personal browsing history.

Figure 5:
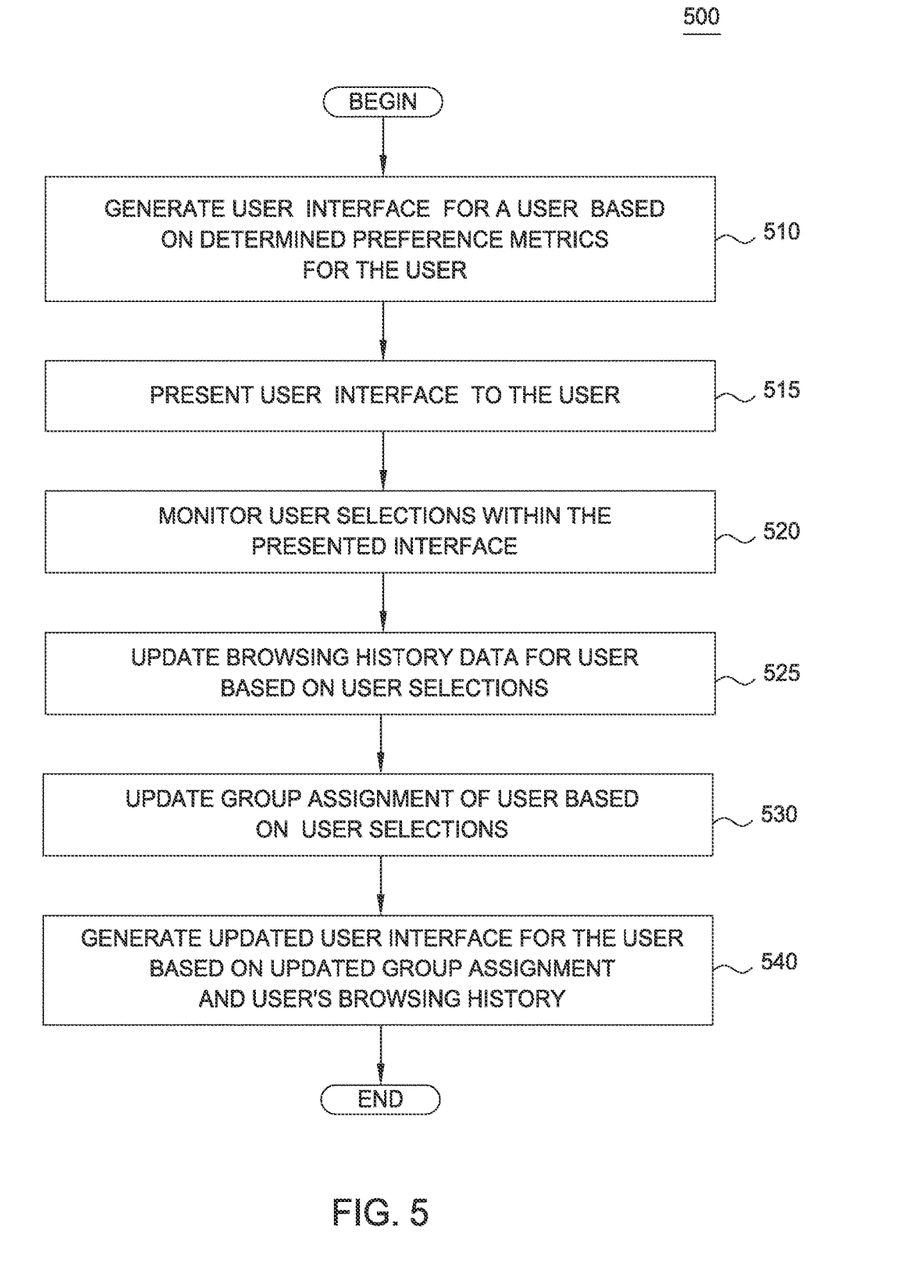
FIG. 5 is a flow diagram illustrating a method for generating a user interface for a user, according to one embodiment described herein.

FIG. 5 is a flow diagram illustrating a method for generating a user interface for a user, according to one embodiment described herein. As shown, the method 500 begins at block 510, where the group-based sorting component 110 generates a user interface for a user based on the user's historical browsing data and preference group assignment. As discussed above, the group-based sorting component 110 could determine preference data and correlational data for each of the preference groups. As an example, the group-based sorting component 110 could determine that users in a particular preference groups that are interested in "Action/Adventure" content items are also interested in content items in the "Westerns" category.

Here, the group-based sorting component 110 could use the user's historical browsing data and preference group assignment to calculate a predicted interest value for the various categories of content on the content server. The group-based sorting component 110 could then generate the interface for the user, in which categories with a higher predicted interest value (i.e., categories predicted to be of more interest to the user) are placed in a more predominant area of the interface than categories with lower predicted interest values. The group-based sorting component 110 then presents the generated interface to the user (block 515).

Once the interface is displayed to the user, the group-based sorting component 110 monitors selections by the user within the presented interface (block 520). Upon detecting a selection of a content item within the interface, the group-based sorting component 110 updates the browsing history data for the user (block 525). For instance, the group-based sorting component 110 could determine which category the selected content item belongs to, and could record this category in the browsing history data for the user. Additionally, in the depicted embodiment, the group-based sorting component 110 also determines whether the user's preference group assignment is still appropriate, after the user's content item selection (block 530). For instance, the group-based sorting component 110 could assign the user to a first preference group based on the demographic to which the user belongs (e.g., determined based on the user's metadata). However, if over time the user repeatedly selects content items from categories that do not match up with the first preference group's browsing patterns, the group-based sorting component 110 could re-assign the user to a second preference group that better matches the user's browsing patterns. In one embodiment, the group-based sorting component 110 is configured to periodically recalculate the preference groups for users of the content server (e.g., as a scheduled batch job), as opposed to after each content selection by the user.

Returning to the depicted embodiment, the group-based sorting component 110 then generates an updated user interface for the user, based on the updated group assignment and browsing history for the user (block 540). For example, the group-based sorting component 110 could calculate a predicted interest value for the user for each category of content on the content server, based on the user's browsing history and the preference data for the preference group to which the user is assigned. The group-based sorting component 110 could then position the categories (or a subset of the categories) within the user interface, based on the calculated predicted interest values. Once the interface is generated, the method 500 ends.

Figure 6:
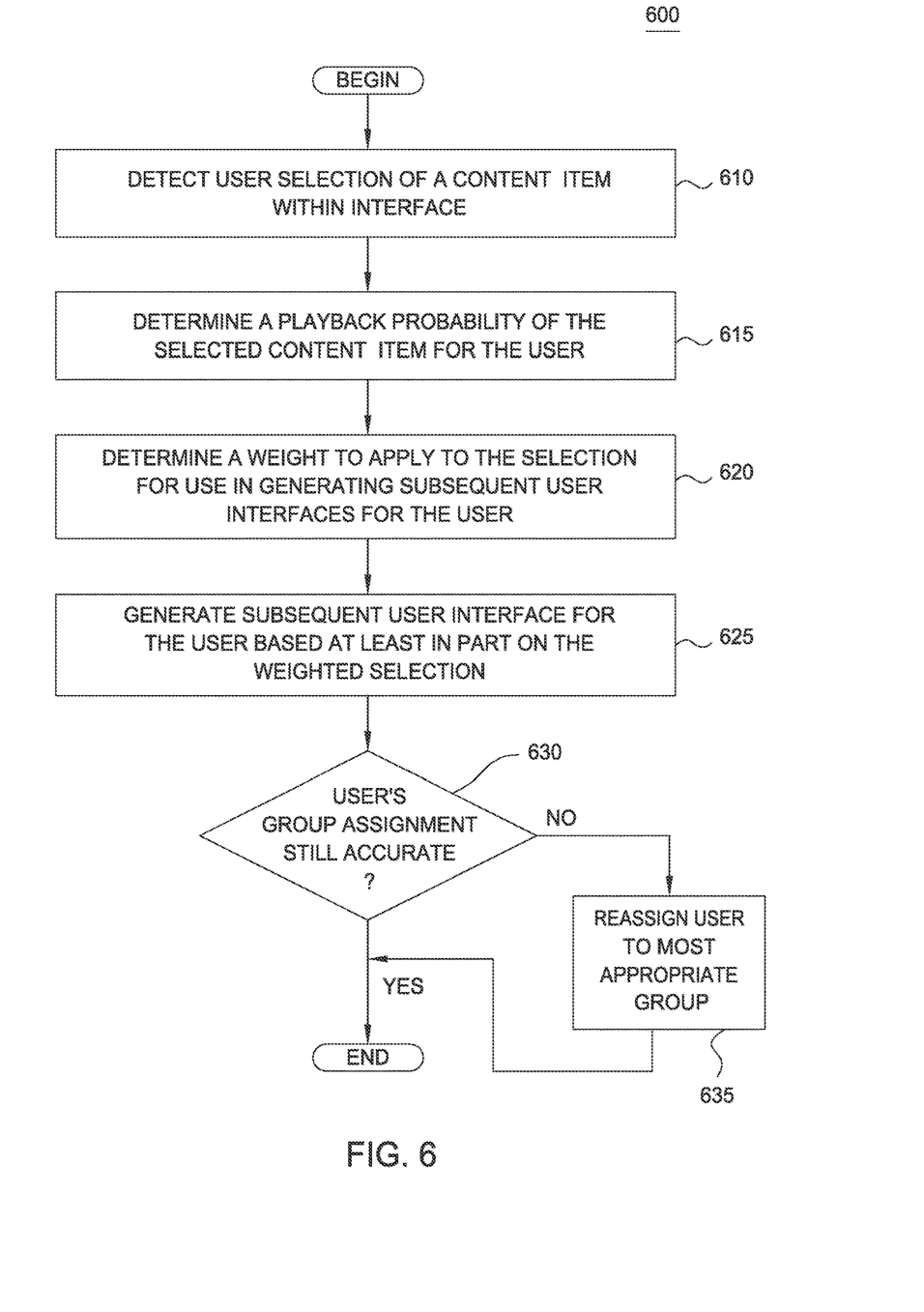
FIG. 6 is a flow diagram illustrating a method for generating a user interface for a user, according to one embodiment described herein.

As discussed above, in some embodiments, the group-based sorting component 110 is configured to the weight the user's selections of content items, based on a probability of playback for the selected content item with respect to the particular user. FIG. 6 is a flow diagram illustrating a method for generating a user interface for a user, according to one embodiment described herein. As shown, the method 600 begins at block 610, where the group-based sorting component 110 detects a user selection of a content item within the interface. In the depicted embodiment, the group-based sorting component 110 then determines a playback probability for the selected content item with respect to the user (block 615). Generally, the playback probability reflects an estimation by the group-based sorting component 110 of how likely the user is to select the selected content item, based on the user's historical browsing data and assigned preference group.

The group-based sorting component 110 then determines a weight to apply to the user's selection, based on the calculated playback probability for the selected content item (block 620). For instance, the group-based sorting component 110 could calculate a weight that is inversely proportional to the playback probability, such that the higher the estimated playback probability for the content item, the less weight that is given to the selection, and the lower the estimated playback probability, the greater the weight given to the selection. Advantageously, by weighting the user's selections, the group-based sorting component 110 can make a greater adjustment to the predicted interest values calculated for the user, when the user selects a content item that the group-based sorting component 110 had estimated the user was unlikely to select. In other words, the group-based sorting component 110 can make a greater adjustment in the situation where the group-based sorting component 110 incorrectly estimated the user's interest in a particular content item, as this could indicate that the group-based sorting component 110 is incorrectly estimating the user's interests.

The group-based sorting component 110 then generates an updated user interface for the user, taking the weighted selection into account (block 625). For example, the group-based sorting component 110 could generate an updated interface based on the user's preference group assignment and weighted browsing history data, in which various categories of content are positioned such that categories estimated to be of more interest to the user are located in more predominant areas of the interface, and categories estimated to be of less interest are located in less predominant areas.

In the depicted embodiment, the group-based sorting component 110 also determines whether the user's current preference group assignment is still accurate (block 630). As discussed above, the group-based sorting component 110 could be configured to periodically update the preference group assignments for the users of the content server as a batch job by applying a clustering algorithm to the preference data for the users. If the group-based sorting component 110 determines that the user's current preference group assignment is inaccurate, the group-based sorting component 110 reassigns the user to the most appropriate preference group (block 635). Once the user has been reassigned to a new preference group, or once the group-based sorting component 110 determines that the user's current preference group assignment is optimal, the method 600 ends.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A method of presenting a user interface, comprising:
    assigning a user to a first preference group of a plurality of preference groups of users based on the user exhibiting an interest in a first content category of content items on a content server, wherein the first preference group is associated with group preference data that specifies a relationship between the first content category and a second content category of the content items on the content server, and wherein the relationship indicates a probabilistic interest by the first preference group in the second content category given an exhibited interest by at least a plurality of users in the first preference group in the first content category;
    for each selectable element included in a first plurality of selectable elements, determining a selection probability corresponding to the selectable element based on historical selections made by the user and the first preference group;
    presenting, on a display device, an initial graphical user interface containing the first plurality of selectable elements, wherein the first plurality of selectable elements is divided into a first plurality of groups each including a respective subset of the first plurality of selectable elements, wherein each of the first plurality of groups is displayed within the initial graphical user interface in a separate and distinct region of the initial graphical user interface, wherein a first group of the first plurality of groups comprises a first subset of the first plurality of selectable elements associated with the second content category, and wherein a second group of the first plurality of groups comprises a second subset of the selectable elements selected using an algorithm adapted for selection of the content items on the content server based on the corresponding selection probabilities;
    detecting a user selection of a first selectable element of the first plurality of selectable elements presented in the initial graphical user interface;
    determining a weighted impact value for the user selection, wherein the weighted impact value is inversely proportional to the selection probability corresponding to the first selectable element;
    adjusting the selection probability corresponding to the first selectable element based on the weighted impact value for the user selection; and
    generating a second graphical user interface on the display device that includes a second plurality of selectable elements organized into a second plurality of groups based on the first preference group to which the user is assigned, the groups within the first plurality of groups to which the user selections belong, and the adjusted selection probability, wherein each group included in the second plurality of groups includes a subset of the second plurality of selectable elements.

2. The method of claim 1, further comprising:
    determining a plurality of content categories that are of interest to the user, based on the first preference group to which the user is assigned and the selectable elements selected by the user,
    wherein the generated second graphical user interface includes at least some of the determined plurality of content categories.

3. The method of claim 1, further comprising:
    updating user preferences data for the user based on the determined weighted impact value.

4. The method of claim 1, further comprising:
    assigning the user to a second one of the plurality of preference groups, based on the plurality of selections made by the user.

5. The method of claim 1, wherein assigning the user to a first one of a plurality of preference groups is based on at least one of (i) metadata associated with the user and (ii) previous selections made by the user.

6. The method of claim 1, wherein the user is one of a plurality of users, and wherein assigning the user to a first one of a plurality of preference groups further comprises:
    applying a clustering algorithm to partition the plurality of users into a plurality of groups, wherein the users are partitioned based on an estimated interest of the respective user in each of a plurality of selectable elements.

7. A non-transitory computer-readable medium containing computer-readable program code which, when executed, performs an operation for presenting a user interface, comprising:
    assigning a user to a first preference group of a plurality of preference groups of users based on the user exhibiting an interest in a first content category of content items on a content server, wherein the first preference group is associated with group preference data that specifies a relationship between the first content category and a second content category of the content items on the content server, and wherein the relationship indicates a probabilistic interest by the first preference group in the second content category given an exhibited interest by at least a plurality of users in the first preference group in the first content category;
    for each selectable element included in a first plurality of selectable elements, determining a selection probability corresponding to the selectable element based on historical selections made by the user and the first preference group;

presenting, on a display device, an initial graphical user interface containing the first plurality of selectable elements, wherein the first plurality of selectable elements is divided into a first plurality of groups each including a respective subset of the first plurality of selectable elements, wherein each of the first plurality of groups is displayed within the initial graphical user interface in a separate and distinct region of the initial graphical user interface, wherein a first group of the first plurality of groups comprises a first subset of the first plurality of selectable elements associated with the second content category, and wherein a second group of the first plurality of groups comprises a second subset of the selectable elements selected using an algorithm adapted for selection of the content items on the content server based on the corresponding selection probabilities;

detecting a user selection of a first selectable element of the first plurality of selectable elements presented in the initial graphical user interface;

determining a weighted impact value for the user selection, wherein the weighted impact value is inversely proportional to the selection probability corresponding to the first selectable element;

adjusting the selection probability corresponding to the first selectable element based on the weighted impact value for the user selection; and generating a second graphical user interface on the display device that includes a second plurality of selectable elements organized into a second plurality of groups based on the first preference group to which the user is assigned, the groups within the first plurality of groups to which the user selections belong, and the adjusted selection probability, wherein each group included in the second plurality of groups includes a subset of the second plurality of selectable elements.

8. The non-transitory computer-readable medium of claim 7, the operation further comprising:

determining a plurality of content categories that are of interest to the user, based on the first preference group to which the user is assigned and the selectable elements selected by the user, wherein the generated second graphical user interface includes at least some of the determined plurality of content categories.

9. The non-transitory computer-readable medium of claim 7, the operation further comprising:

updating user preferences data for the user based on the determined weighted impact value.

10. The non-transitory computer-readable medium of claim 7, the operation further comprising:

assigning the user to a second one of the plurality of preference groups, based on the plurality of selections made by the user.

11. The non-transitory computer-readable medium of claim 7, wherein assigning the user to a first one of a plurality of preference groups is based on at least one of (i) metadata associated with the user and (ii) previous selections made by the user.

12. The non-transitory computer-readable medium of claim 7, wherein the user is one of a plurality of users, and wherein assigning the user to a first one of a plurality of preference groups further comprises:

applying a clustering algorithm to partition the plurality of users into a plurality of groups, wherein the users are partitioned based on an estimated interest of the respective user in each of a plurality of selectable elements.

13. A repository system, comprising:

a memory storing a group-based sorting component; and a processor coupled to the memory, wherein, when executed by the processor, the group-based sorting component configures the processor to:

assign a user to a first preference group of a plurality of preference groups of users based on the user exhibiting an interest in a first content category of content items on a content server, wherein the first preference group is associated with group preference data that specifies a relationship between the first content category and a second content category of the content items on the content server, and wherein the relationship indicates a probabilistic interest by the first preference group in the second content category given an exhibited interest by at least a plurality of users in the first preference group in the first content category;

for each selectable element included in a first plurality of selectable elements, determine a selection probability corresponding to the selectable element based on historical selections made by the user and the first preference group;

present, on a display device, an initial graphical user interface containing the first plurality of selectable elements, wherein the first plurality of selectable elements is divided into a first plurality of groups each including a respective subset of the first plurality of selectable elements, wherein each of the first plurality of groups is displayed within the initial graphical user interface in a separate and distinct region of the initial graphical user interface, wherein a first group of the first plurality of groups comprises a first subset of the first plurality of selectable elements associated with the second content category, and wherein a second group of the first plurality of groups comprises a second subset of the selectable elements selected using an algorithm adapted for selection of the content items on the content server based on the corresponding selection probabilities;

detect a user selection of a first selectable element of the first plurality of selectable elements presented in the initial graphical user interface;

determine a weighted impact value for the user selection, wherein the weighted impact value is inversely proportional to the selection probability corresponding to the first selectable element;

adjust the selection probability corresponding to the first selectable element based on the weighted impact value for the user selection; and generate a second graphical user interface on the display device that includes a second plurality of selectable elements organized into a second plurality of groups based on the first preference group to which the user is assigned, the groups within the first plurality of groups to which the user selections belong, and the adjusted selection probability, wherein each group included in the second plurality of groups includes a subset of the second plurality of selectable elements.

14. The repository system of claim 13, wherein the group-based sorting component further configures the processor to:
    determine a plurality of content categories that are of interest to the user, based on the first preference group to which the user is assigned and the selectable elements selected by the user,
    wherein the generated second graphical user interface includes at least some of the determined plurality of content categories.

15. The repository system of claim 13, wherein the group-based sorting component further configures the processor to:
    update user preferences data for the user based on the determined weighted impact value.

16. The repository system of claim 13, wherein the group-based sorting component further configures the processor to:
    assign the user to a second one of the plurality of preference groups, based on the plurality of selections made by the user.

17. The repository system of claim 13, wherein assigning the user to a first one of a plurality of preference groups is based on at least one of (i) metadata associated with the user and (ii) previous selections made by the user.

18. The repository system of claim 13, wherein the user is one of a plurality of users, and wherein assigning the user to a first one of a plurality of preference groups further comprises:
    applying a clustering algorithm to partition the plurality of users into a plurality of groups, wherein the users are partitioned based on an estimated interest of the respective user in each of a plurality of selectable elements.

\* \* \* \* \*